Figure 1:
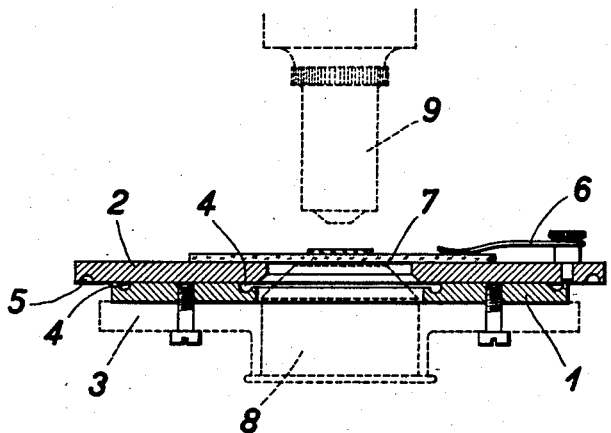

Feb. 9, 1937.   W. BAUERSFELD   2,070,037
MICRO-MANIPULATOR
Filed March 2, 1934   2 Sheets-Sheet 1

Inventor:
Walther Bauersfeld

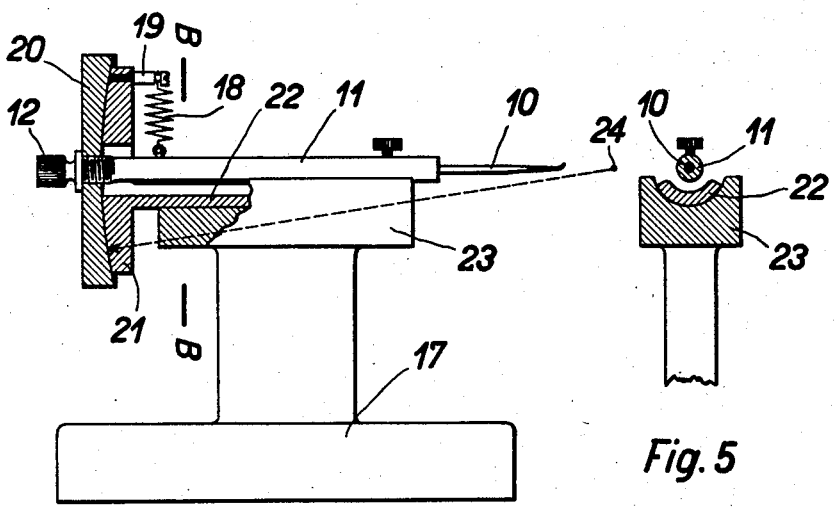
Fig. 4
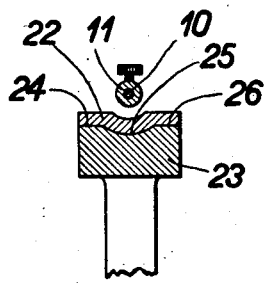
Fig. 5
Fig. 6
Inventor:
Walther Bauersfeld.

Patented Feb. 9, 1937

2,070,037

UNITED STATES PATENT OFFICE 2,070,037

MICRO-MANIPULATOR

Walther Bauersfeld, Jena, Germany, assignor to firm Carl Zeiss, Jena, Germany

Application March 2, 1934, Serial No. 713,672
In Germany March 2, 1933

2 Claims. (Cl. 88—40)

I have filed an application in Germany, March 2, 1933 of which the following is a specification:

It is known to be practically impossible to impart to a microscopically magnified object microspically small movements by hand. To overcome this inconvenience, the suggestion has been made to automatically guide in checks a suitable guiding body to which the object to be displaced is attached and to impart the desired movement to this body by mechanically gearing it down by hand. Devices of this kind are, however, comparatively unpractical and rather costly.

The invention concerns a device which differs from the known devices of this kind in that it is especially simple, and, consequently, comparatively cheap. A body supports a guiding body which holds the object to be moved, the two bodies being continuously held together by the adhesive power of a thin intermediate layer of a viscous substance. Those surfaces of the said two bodies which are covered by the intermediate layer may be plane as well as cylindrical or spherical. The substances for the intermediate layer may be, for instance, oil, grease or semi-liquid resin. On account of its intrinsic friction, a layer of one of these substances offers the movement of the guiding body on the supporting body a considerable resistance, and, as a consequence, the guiding body follows the pressure of the hand only slowly and remains in position as soon as this pressure is discontinued. When the layer covers a sufficiently large area, which is to measure several square centimeters under normal conditions, the two bodies adhere comparatively tightly to each other, and the guiding body yields to a slight pressure by hand in such a manner that its movements may not be noticed with the naked eye, it being not difficult at all to impart to it displacements of as low a magnitude as one $\mu$. As a matter of course, the guiding as well as the supporting body may be of any material which can be ground or polished, the preference having to be given to metals, glass, quartz and the like.

When using a plane surface as a supporting surface, the guiding surface and the object to be moved, which is attached to the same, may be given any movements in two directions at right angles to each other. If it is desired to displace the object only along a straight line, the supporting surface covered by the intermediate layer is preferably a broken surface consisting of several parts belonging to surfaces that intersect each other in lines parallel to the direction of displacement. The supporting surface may consist in this case of, for instance, a V-shaped groove having plane walls, or of a plane surface and a cylindrical surface one or two generatrices of which lies or lie in the plane, or of two cylindrical surfaces having a common generatrix. The desired purpose may be attained eventually by a simple cylindrical surface, and this especially when the object to be displaced is desired to be rotated at the same time.

When the object is to move in three directions at right angles to each other, a plurality of supporting surfaces which determine movements in different directions may be so placed behind each other that one body represents a guiding body with respect to another body and a supporting body with respect to a third body.

Figures 2, 3:
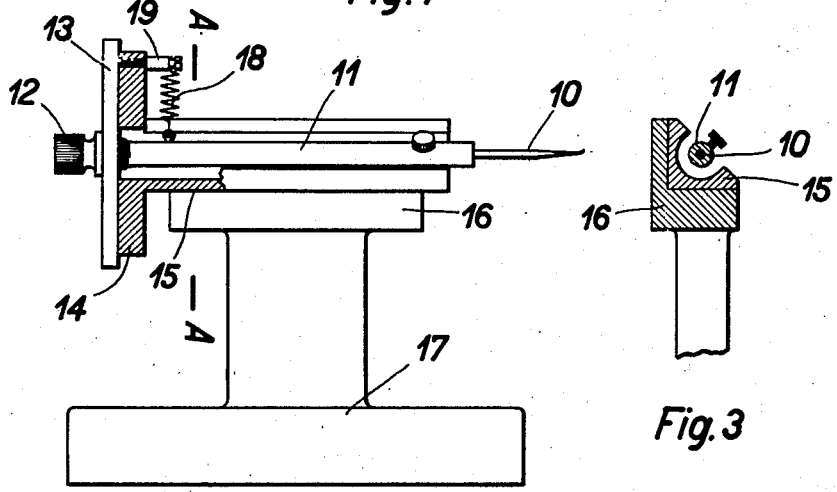

The accompanying drawings represent three constructional examples of the invention. Figure 1 shows the first constructional example in central elevational section. Figure 2 shows the second constructional example in part-sectional elevation, and Figure 3 represents a section through the line A—A in Figure 2. Figure 4 illustrates the third constructional example in part-sectional elevation, and Figure 5 shows a section through the line B—B in Figure 4. A variation of this section is illustrated by Figure 6.

The first constructional example (Figure 1) is an object guide for microscopes. This object guide consists of two annular steel plates 1 and 2. The steel plate 1, which represents a supporting body, is screwed to the microscope stage 3. Its surface, which is polished, has two annular grooves 4. The polished surface of the plate 2, which represents a guide body, rests against the polished surface of the plate 1. Into the margin of the polished surface of the plate 2 is worked an annular groove 5. The plate 2 is provided with one of the usual holders 6 for object slides 7.

When the device is to be used, a thin layer of vaseline is applied to the polished surface of the plate 1, and the plate 2 is slid onto the plate 1. Subsequently thereto, a condenser prism 8 is placed into the microscope stage, and a preparation on an object slide 7 may be positioned on the stage. To bring all points of the surface of this preparation subsequently to each other into the field of view of the microscope objective 9, or to make a definite point of this preparation lie at the centre of the field of view, the observer's fingers are to impart a pressure in the corresponding direction to the edge of the plate 2, this plate following the pressure very slowly and remaining in position as soon as it is released from this pressure. There is no difficulty in improving the position of the preparation by subsequent microscopically small displacements of the plate. When the plate 2 is being moved, the superfluous quantity of vaseline is taken up by the annular grooves 4 and 5.

The second constructional example (Figures 2 and 3) represents a micromanipulator, that is to say an instrument for manipulating single parts of a preparation under microscopical examination. This manipulation is effected by means of a tool 10 which is fixed into a tubular holder 11 having a milled head 12 and screwed to a plate 13. The plate 13 represents a guiding body and lies with a plane polished surface against an equally prepared surface of an annular body 14 provided with a V-shaped piece 15. The piece 15, whose exterior surfaces also consist of plane polished superficial parts, lies with these superficial parts against a supporting body 16, which also represents a V and is cast to a foot 17. The weight of the tube 11 and the plate 13 is balanced by a spring 18 suspended from a screw 19 in the annular body 14.

When the device is used, the body consisting of the parts 14 and 15 represents the guiding body with respect to the body 16 and the supporting body with respect to the body 13. The supporting surfaces between the bodies 13 and 14 and between the bodies 15 and 16 are covered by a thin layer of vaseline. The device makes it possible to effect microscopically small displacements of the tool 10 in three directions at right angles to each other, and this in the manner required for instance for individually isolating bacteria in a suspended drop. A pressure by hand against the head 12 in the direction of the tool 10 entails a displacement in a horizontal direction parallel to the line of intersection of the two polished superficial parts of the V-shaped piece 15. By pressing the head 12 in a direction at right angles to the first said direction there may be attained any desired movement in a vertical plane, the plate 13 being displaced on the annular body 14. Similarly to the first example, the constructional example illustrated by Figures 2 and 3 makes it possible that microscopically small displacements may be effected by hand.

The third constructional example (Figures 4 and 5) is similar to the second constructional example, the difference being that the supporting surfaces are curved and not plane. The plate 20, which holds the tubular tool holder 11, is provided with a polished spherical surface by means of which it lies against a corresponding spherical surface of an annular body 21. This body 21 has a cylindrical piece 22 instead of the V-shaped piece according to the second example. The said cylindrical piece 22 lies in a cylindrical supporting body 23 on a foot 17. The spherical surfaces of the bodies 20 and 21 are so curved that their centre 24 lies in front of the point of the tool 10.

The device is used in quite the same manner as that according to the second example. The curved supporting surfaces, which are naturally also covered by a thin layer of grease, offer the following advantages. A cylindrical surface being provided between the piece 22 and the supporting body 23, the tool 10 may not be only displaced along straight lines but also rotated about its axis to a certain extent. Making a spherical surface between the plate 20 and the annular body 21 represent a supporting surface entails a further improvement of the accuracy of the movement of the tool. According to the position of the centre 24 relative to the point of the tool, there is varied the ratio of the transmission of the movements of the head 12 and the plate 20 to the point of the tool 10. In other words, the point 24 may be made to lie very near the tool 10, which largely increases the accuracy of the said movements. When the point 24 is made to lie behind the point of the tool 10, the movements on the spherical supporting surface are effected by the tool 10 in the reverse sense.

In case no importance is attached to rotations of the tool 10, the supporting surface between the parts 22 and 23 may be constructed according to what is represented by Figure 6. The supporting surface according to Figure 6 consists of three parts 24, 25 and 26, the two parts 24 and 26 lying in a plane, and the part 25 belonging to a cylinder. The supporting surface effects that the tool 10 is displaced parallel to the two edges of the cylinder surface 25 intersecting the planes 24 and 26, which are to be parallel to each other.

I claim:

1. A device for so guiding by hand an object in the field of a microscope as to make it effect microscopically small movements, consisting of a supporting body, a guiding body adapted to hold the object to be viewed, the said guiding body being loosely supported by the said supporting body, the said supporting and guiding bodies having smooth contact surfaces of substantial areas, the said contact surfaces being such as to permit the said guiding body to move on the said supporting body in two directions perpendicular to each other, and a thin layer of a viscous substance placed between the said two bodies, the adhesive power of this thin layer continuously connecting the two bodies to each other.

2. A device for so guiding by hand an object in the field of a microscope as to make it effect microscopically small three-dimensional movements, consisting of a supporting body, a guiding body loosely supported by the said supporting body, another guiding body loosely supported by the first said guiding body and adapted to hold the object to be viewed, the said supporting and guiding bodies having smooth contact surfaces of substantial areas, the said contact surfaces being such as to permit the said guiding bodies to move on the respective supporting bodies in two directions perpendicular to each other, the two contact surfaces of the first said guiding body being inclined substantially at right angles to each other, one of the said two contact surfaces of the first said guiding body being a cylindric surface parallel to a line perpendicular to the other contact surface of the first said guiding body, and thin layers of a viscous substance placed between the said three bodies, the adhesive power of the said thin layers continuously connecting the three bodies to each other.

WALTHER BAUERSFELD.